United States Patent [19]
Lebet

[11] Patent Number: 5,936,540
[45] Date of Patent: Aug. 10, 1999

[54] PROCESS FOR THE MANAGEMENT OF CONCURRENT ACCESS AND DEVICE FOR PRACTICING THE SAME

[75] Inventor: Jean-Philippe Lebet, Les Genevreys-sur-Coffrane, Switzerland

[73] Assignee: Eric Bauer, Neuchatel, Switzerland

[21] Appl. No.: 08/766,623

[22] Filed: Dec. 13, 1996

[30] Foreign Application Priority Data

Dec. 13, 1995 [CH] Switzerland .............................. 3522/95

[51] Int. Cl.$^6$ .................................................. H04Q 7/00
[52] U.S. Cl. ............................... 340/825.07; 340/825.08; 340/825.54; 340/825.64; 340/825.65; 342/42; 342/51; 235/380; 235/382; 235/382.5
[58] Field of Search ......................... 340/825.07, 825.08, 340/825.54, 825.64, 825.65, 825.67; 342/42, 51; 235/380, 382, 382.5; 375/238

[56] References Cited

U.S. PATENT DOCUMENTS 4,691,202  9/1987  Denne et al. ....................... 340/825.54
5,369,784  11/1994  Nelson ................................... 455/51.2

FOREIGN PATENT DOCUMENTS

| | | |
|---|---|---|
| 0 161 779 | 11/1985 | European Pat. Off. . |
| 0 229 631 | 7/1987 | European Pat. Off. . |
| 0 322 701 | 7/1989 | European Pat. Off. . |
| 0 553 905 | 8/1993 | European Pat. Off. . |
| 0 577 328 | 1/1994 | European Pat. Off. . |
| 0 600 374 | 6/1994 | European Pat. Off. . |

*Primary Examiner*—William A. Cuchlinski, Jr.
*Assistant Examiner*—Yonel Beaulieu
*Attorney, Agent, or Firm*—Young & Thompson

[57] ABSTRACT

Process for managing concurrent access permitting the successive input or storage of several slave devices (receiver/transmitter) in the field of action of a master device (emitter/reader) so as to render possible the exchange of data in two directions whilst guaranteeing coherent transmission between the master device and each slave device. This process is based on a double temporary address of the slave devices. Upon each command emitted by the reader, two values are transmitted, the first comprising the identification of the next free number and the second the number of the receiver to which the command is directed.

9 Claims, 3 Drawing Sheets

PROCESS FOR THE MANAGEMENT OF CONCURRENT ACCESS AND DEVICE FOR PRACTICING THE SAME

BACKGROUND OF THE INVENTION

The present invention relates to a device for managing concurrent access as well as to an electronic device for its practice. Numerous applications such as the control of access of persons to localities or to installations, the control of automated processes along a production line, or the counting of products, use electronic devices known as contactless smart cards, tags or transponders. These devices, having no internal energy source, generally comprise at least one interfacial circuit coupled to an antenna and a programmable memory. They can moreover comprise a microprocessor and/or other electronic circuits adapted to process and transmit data contained in their memory. They are carried by their holder or by the object to be controlled and serve, as the case may be, as an access key to an installation, as an automatic access memory permitting the recovery or modification of prerecorded data, as a memory for variable data, such as prepayment units or as electronic tickets for controlling processes. These slave devices are adapted to be used with a master electronic device (emitter/reader) comprising electronic components necessary for the generation, shaping and emission of a modulated carrier bearing a coded signal.

DESCRIPTION OF THE RELATED ART

When a slave device is located in the alternating radiation field emitted by a master device, its antenna can extract from the alternating field (carrier field) the energy necessary for the temporary supply of its electronic circuits. These circuits thus serve to establish a dialogue with the master device according to a preestablished protocol. One of the principal problems inherent in this technology relates to the management of concurrent access, which is to say the successive entry or the simultaneous presence of several slave devices into the field of action of the master device. Thus, upon their activation, the slave devices serve to communicate simultaneously with the master device, which cannot determine from which slave device the emitted data arise. To solve this problem, it is provided that only one slave device at a time can be located in the field of action of the master device, which is done by any sort of means consisting in channeling or in serializing the flow of persons and/or objects carrying the slave device; in particular by restrictions limiting the access to a single person adjacent the master device or by a transport system for programmed items so that only one item at a time can pass before the master device. This solution has multiple drawbacks such as the limitation of flow rate or the inherent costs for the provision of the control means.

Other techniques based on a unique serial number inscribed permanently in the slave device permit managing concurrent access. After transmission of this serial number, the master device has means to identify the slave device to which it wishes to transmit a command. Nevertheless, this requires the transmission of this serial number for each dialogue. To guarantee the integrity of this serial number, it is necessary to encode it with a large number of bits, for example 24 or 32 bits. The transmission of this identification can become costly in energy, which is a major drawback, particularly in slave devices having no internal energy source. Moreover, the processes for production of the slave devices provided with a unique serial number are more complicated and more costly to perform.

On the other hand, to guarantee a suitable field of use for such systems, it is necessary that the slave devices have sufficient energy to function correctly, which is to say to supply their electronic circuits and to permit the easy extraction of a time signal. The energy which can be extracted from the radiant field emitted by the master device at the antenna of the slave device depends among other things on the time during which the signal is emitted at the nominal amplitude. Known codes do not permit extracting energy more than during about half the time necessary for the transmission of one bit. This has the result of limiting the useful field of the system.

SUMMARY OF THE INVENTION

The object of the present invention is to overcome the above drawbacks and to permit the arrival and/or presence of a predetermined number of slave devices in the field of action of a master device and to guarantee reliable and redundant transmission between the sender/reader and each slave device present. This object is achieved thanks to a management process of concurrent access and a device for its practice.

The principal advantage of such a process, in the case of the control of the access of people to an installation for example, is to be able to increase the frequency of passage whilst saving on physical devices such as restrictions or other means for channeling the flow of people to ensure that only a single person at a time is located in the field of the reading device.

Other advantages will become apparent from the characteristics recited in the dependent claims and in the description. There can be particularly cited the modulable redundance of the system offering reliability that can be predetermined as a function of the type of application and a suitable coding of the data to be transmitted which permits increasing the energy available for the slave devices.

As to the device for practicing the process, the advantages are greater reliability for the transmission which accordingly permits increase in security and a modular embodiment which decreases the cost of production of such devices.

BRIEF DESCRIPTION OF THE DRAWINGS

The accompanying drawing illustrates by way of example the structure of the coding screen for data as well as a diagram of the principle of the device for practicing the process.

DESCRIPTION OF THE PREFERRED EMBODIMENTS

Figure 1:
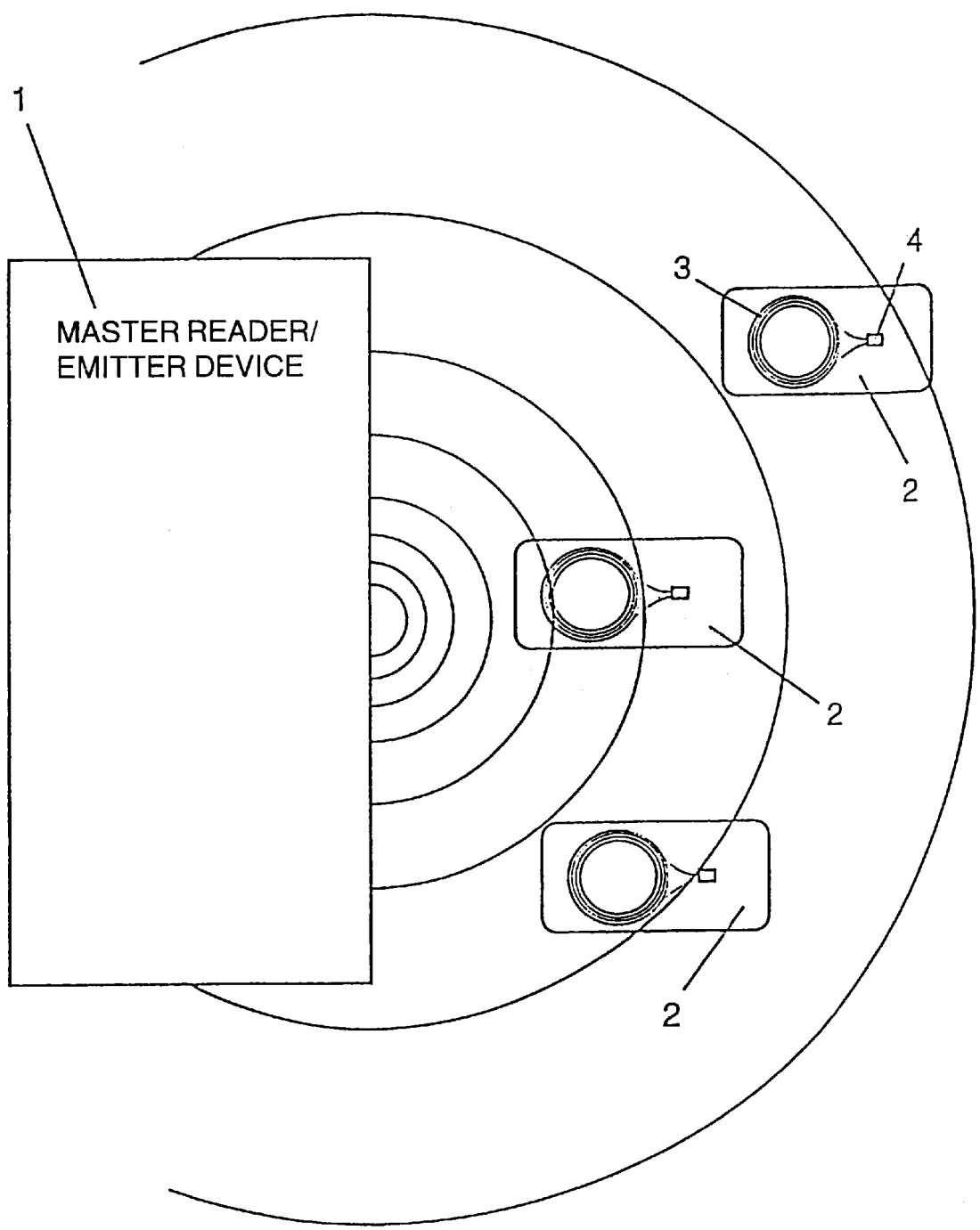
FIG. 1 is a schematic view of the master device and of several slave devices each integrated into a portable support represented here in the form of a non-contact card.

With reference to FIG. 1, the process which is the object of the present invention will now be described for a flow of data passing between, on the one hand, a master reader/ emitter device 1 comprising the known electronic components necessary for the generation, the shaping and the emission of a modulated carrier bearing a coded signal, and, on the other hand, one or several receiver/transmitter slave devices 2 shown in the form of a contactless card comprising an antenna 3 connected to a programmable integrated memory microcircuit 4 It will be noted that the slave devices 2 have no internal energy source and accordingly become "active" only when they are located in the field of action of the radiant electromagnetic field (shown by concentric circuits) emitted by the master device 1 and that the energy induced in the antenna 3 is sufficient to activate the microcircuit 4.

Figure 2:
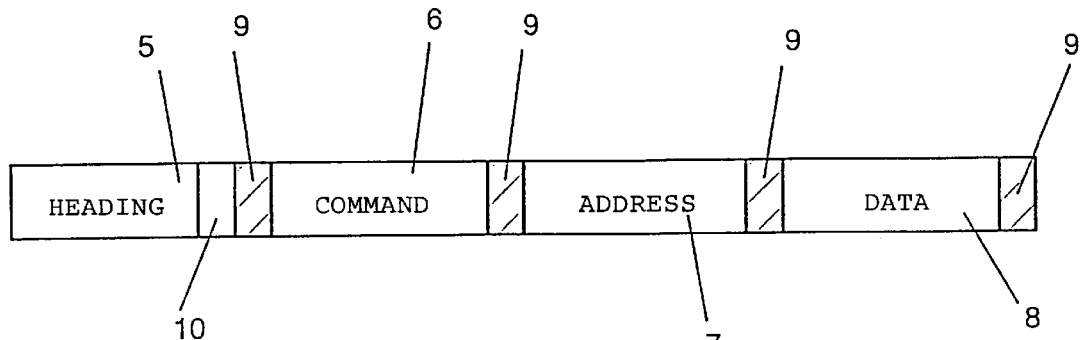
FIG. 2 is a schematic diagram of the structure of the coding screen for the data.

FIG. 2 shows in a schematic manner the data coding screen. This screen is a succession of bits of predetermined length with or without a break in the sequence for resumption of synchronization and chose the normalized format for the commands omitted by the master device. This screen is subdivided into four blocks 5, 6, 7, 8 bearing data and into five intermediate elements 9, 10. Each of the blocks 5, 6, 7, 8 has a length of 8 to 16 bits. The first block 5 is a heading block which is always emitted by the master device 1, even in the absence of slave devices 2 in its field of action. The second block 6 comprises the control code emitted as well as a redundancy factor. The third block 7 contains an address and the fourth block 8 contains data. In use, emission by the master device, of the control blocks 6, address blocks 7 and data blocks 8 is facultative and depends on the action which it is desired to trigger by the command, in the slave devices 2. The intermediate elements 9 contain the transmission control bits such as the parity bits to assure reliable transmission of the blocks 5, 6, 7, 8. The element 10 corresponds to the response of a slave device 2 at the moment at which this latter, after having entered the field of action of the master device, acknowledges its inscription.

Figure 3:
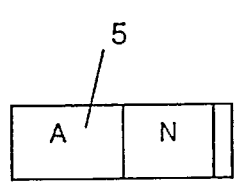
FIG. 3 is a schematic view of the heading block of the screen illustrated in FIG. 1.

FIG. 3 shows in more detail the heading block 5 of the coding screen. This heading block comprises two times four control bits which will be referenced by N for NEXT and A for ACTU. Upon the initialization of the master system, when no slave device 2 is located in the field of action of the emitted field, the value of N is initialized at 1 for example and the value of ACTU at 0.

The master device 1 then transmits at a predetermined frequency, for example every thirtieth of a second, headings 5 containing the values of NEXT and ACTU. At the moment at which the first slave device enters into the radiant field emitted and becomes active, until reception of the heading, it retains the value NEXT in an internal register, initializes the bit 10 of the heading to a predetermined value and transmits to the master device a heading 5 which serves as acknowledgment of inscription. Upon the transmission of this acknowledgment of inscription, it ceases all transmission and places itself in a waiting mode for a command from the master device 1. The master device, upon reception of the acknowledgment of the slave device 2, increments the value of NEXT N of one unit and knows as a result that a slave device referenced by NEXT—1 is present in its field of action. When the master device wishes to establish a dialogue with a slave device 2, it initializes the value ACTU to the temporary number attributed to this slave device and transmits a command. The slave device, each time it receives a command, begins by comparing the value of ACTU to that which it retained in its internal register at the time of its inscription. If the transmitted value of ACTU corresponds to the memorized value, the device executes the command, but in the contrary case it ignores the command. It is important to note that at each transmission of a command from the master device, the value of NEXT is transmitted and that it is different from that of ACTU such that at any moment a new slave device can enter into the field of action and cause the incrementation of the NEXT value whilst safeguarding this latter in an internal register, then by transmitting its acknowledgment of inscription. A new slave device can thus be inscribed at any moment, even during emission of a command directed toward another present slave device. It is therefore because of this fact possible, thanks to this double temporary addressing, to establish a coherent transmission between the master device and each of the active slave devices. Moreover, a transmission of the number referencing a slave device, takes place only in the master-slave sense and is because of this not costly in energy for the slave device. By coding the value of ACTU and of NEXT on four bits, it is possible to address simultaneously 14 or 15 slave devices 2 according to the codes used. The number of slave devices processed is unlimited, because the numbers can at any time be redistributed to new entering slave devices 2. Thus, if the value of NEXT is 15 and a slave device 2 enters into the field of action and acknowledges its inscription, the value of NEXT again becomes 1, and so on. It will also be noted that even if a slave device inadvertently leaves the radiation field, and hence is no longer able to execute commands emitted by the master device, the commands emitted by the master device directed to it do not disturb the other slave devices 2 that are already present.

According to the type of application, it is necessary to introduce redundancy to increase the reliability of processing. There can be cited by way of example the case in which it is desired to count up or count down the units of payment contained in the slave device, which requires increased security relative to simple access controls.

Figure 4:
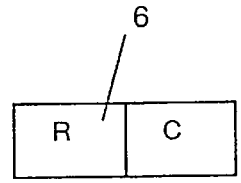
FIG. 4 is a schematic diagram of the control block of the screen illustrated in FIG. 1.

There is then used a block control structure 6 identical to that shown in FIG. 4. 8 bits are reserved in the control block 6 of which the first four are assigned to a redundancy factor indicated by R. The four last bits serve to encode the control, which offers 16 possible different controls. The value of R also encoded by four bits, can take values from 0 to 15.

As a function of the type of command to be transmitted to the slave device, the master device initiates the value R with a certain factor as a function of the desired security, initiates the values of NEXT and ACTU, then transmits the desired command.

When the slave device decodes a screen, it begins, as mentioned above, by comparing the value of ACTU transmitted, with the value which it has saved in its internal register. If this command is directed to it, the slave device decodes the value R contained in the control block 6. If this value is equal to 1, the device executes the command and acts according to the received command code If on the contrary, the value of R is greater than 1, the slave device saves the value of the control code, and its possible parameters (address, data) in a comparison circuit, and saves the value of the factor R in an internal register, then returns to "listening" for commands directed toward it. Upon the receipt of each new command, the slave device commences by comparing the value of the control code C with that retained in the comparator. In a suitable case, it counts down the value of R retained in its register by one unit. When R equals 0, which is to say at the moment at which the slave device 2 will have received the same command R times, it will execute this command.

There is thus obtained a transmission whose redundancy can be controlled as a function of the type of application envisaged.

The end of the dialogue between the master device and a slave device takes place by the emission of specific command code by the master device 1 (for example a command code of which all the bits are 1).

Figure 5:
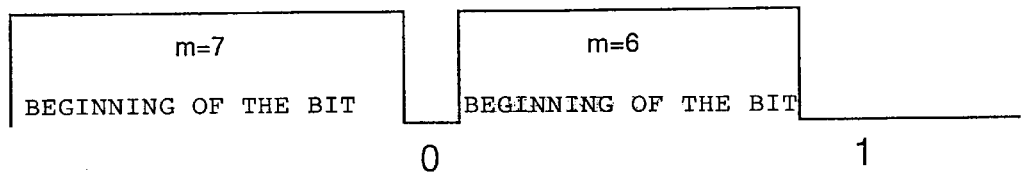
FIG. 5 shows the coding of the signals used for the transmission of data.
Figure 5:
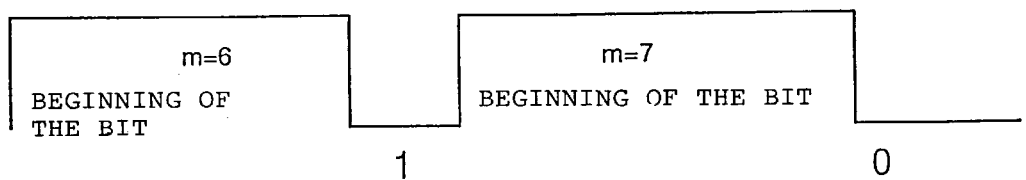

The transmission of bits in series requires, particularly when frequency filters are necessary to have the desired selectivity and sensitivity for a long distance transmission, an adequate coding to ensure efficacious transmission. This excludes an all or nothing coding of the bits, which has the consequence that the extreme values of the frequency vary all the more, the longer are the words to be transmitted. The known codes MANCHESTER and CDP have the characteristic of varying the frequency only between f and 2f no matter what the content of the transmitted binary word. For example at 125 kHz, the representation of a bit requires 64 carrier cycles. The coding MANCHESTER is divided into two parts of 32 cycles with a transmission in the middle of which the direction determines the value of the bit (1 or 0) This type of coding however has a problem of energy to the extent to which for the representation of one bit, the signal will not be modulated more than for one half of the cycle, and as a result the slave device cannot extract energy and hence supply a clock signal (CLK) other than during half the time, thereby limiting the maximum distance between a slave device and the master device. To overcome this drawback, the applicant provides a type of coding illustrated in FIG. 5 This coding permits representing a bit by dividing the number of cycles of the carrier necessary for the representation of one bit, into 8 equal subdivisions. Thus, again at 125 kHz, the 64 cycles necessary for the representation of one bit are subdivided into 8 subdivisions each of 8 cycles. To represent a 0, the signal will be modulated for seven subdivisions (m=7) and the representation of 1 will take place by modulation during six subdivisions (m=6). It will be noted that this choice is arbitrary and that 0 could be represented by modulation during six subdivisions and 1 by modulation of the signal during seven subdivisions. This type of coding is useful no matter what the selected working frequency, only the ratio between the number of cycles during which the signal is modulated and the total number of cycles necessary for the representation of one bit being significant. As a result, this type of coding permits increasing the energy available for the electronic circuits whilst permitting the easy extraction of a time signal. Thanks to this coding, the slave device can work at a greater distance from the master device than is the case when using traditional coding.

Figure 6:
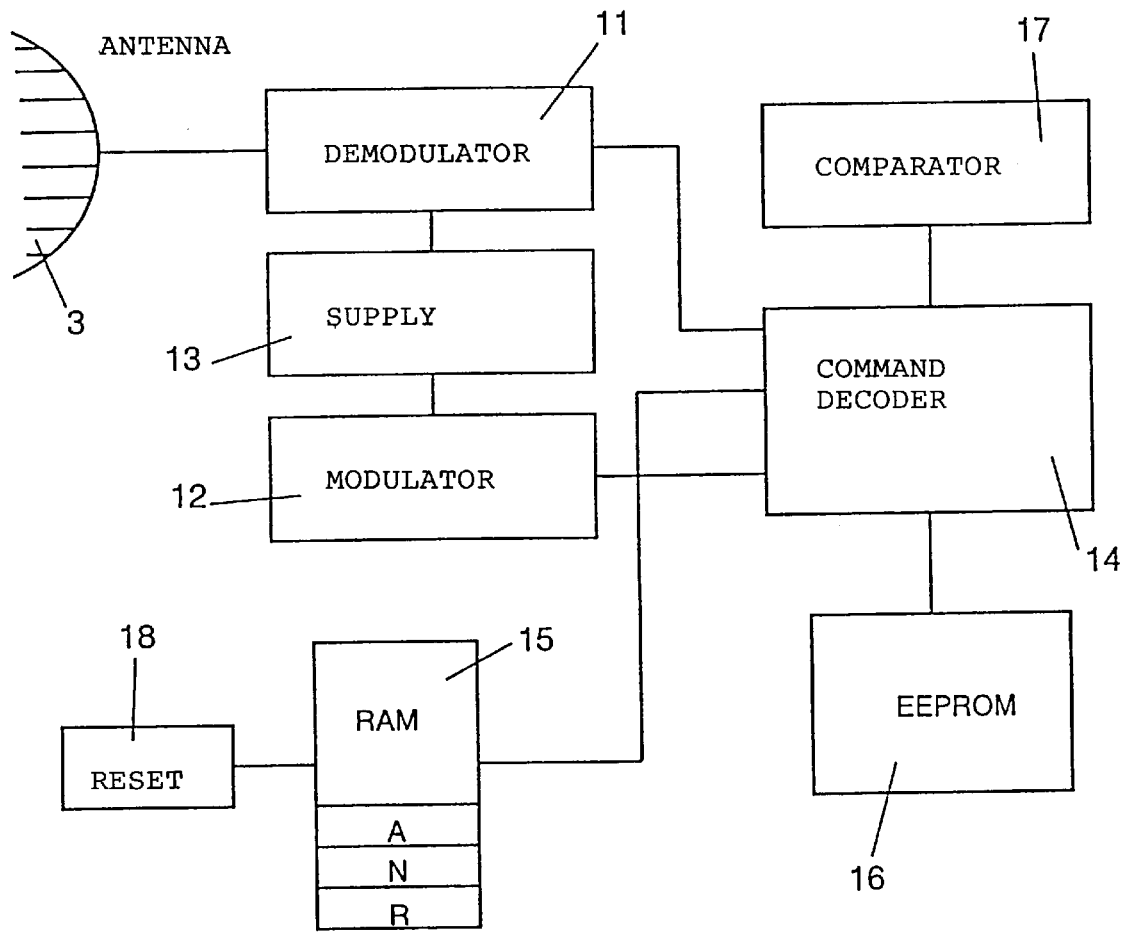
FIG. 6 is a diagram of the principle of a slave device.

FIG. 6 shows in a schematic manner the different elements necessary for the operation of the slave device 2. The final embodiment of these circuits is of little consequence, the slave device being adapted to be produced by using various technologies according to the desired degree of miniaturization.

The slave device 2 comprises a non-directional antenna 3 whose operation is two-fold. It permits, on the one hand, receiving and transmitting signals to the master device 1, and, on the other hand, it is capable of extracting from the alternating field (the carrier field) emitted by the master device 1, the energy necessary for the supply of the circuits of the slave device 2. The slave device 2 comprises an analogical portion in which are found the following elements: a demodulator 11 capable of extracting from the modulated carrier the coded signal bearing the information transmitted by the master device 1, a modulator 12 permitting modifying the radiant field such that the coded disturbance will be detectable by the master device 1, and an autonomous supply circuit 13 depending on the power extracted from the radiation field. The device also comprises a logical or control decoder unit 14 which permits upon reception of a control, determining and triggering the actions to be carried out by the slave device 2, as for example the reading or writing of one bit in a region of the memory. A volatile memory region 15 comprising at least two registers adapted to receive in a temporary manner addresses transmitted by the master device. A non-volatile memory region 16 with or without protection is arranged so as to ensure permanent internal storage of data such as the arrangement and configuration or data relative to the holder of the device. There will preferably be used for this type of memory an EEPROM memory cell. The slave device 2 comprises moreover a comparison circuit or comparator 17 receiving on the one hand data from the command emitted by the master device 1 and, on the other hand, data from the internal memory 15, 16 of the slave device. A zero reset device 18 for functions permits canceling the addresses inscribed in the registers of the volatile memory zone 15, for example at the time of powering on reset. Finally, an analogic interface circuit (not shown) permits transforming binary signals of the modulator 12 into electromagnetic signals at the antenna 3 and conversely toward the demodulator 11. The elements described above are sufficient for practicing the steps of the process impressed on the slave device.

In a preferred embodiment of the slave device, all the elements described above, except the antenna, will be disposed in a monolithic integrated circuit. The antenna 3 and the integrated circuit 4 will be encapsulated in a thin and flexible support of the type of a credit card (as schematically illustrated in FIG. 1).

So as to reduce the cost of fabrication of the contactless card, the integrated circuit 4 is provided in a variable form with several functional blocks, such that no matter what the use envisioned for the contactless card it will always be produced in the same way. It is only upon delivery of the device that the card will be configured as a function of the use to which it is to be put. There will be used for this certain bits from the non-volatile EEPROM memory to direct irreversibly the signals toward certain functional blocks. Moreover, so as to reduce the energy consumption of the device and hence to increase its useful field, not only will the signals from the unused functional blocks be disconnected, but also the energy supply to these functional blocks will be disconnected.

I claim:

1. Process for the management of concurrent access between a master emitter/reader device (1) and plural receiver/transmitter slave devices (2) entering successively into or remaining in the field of action of the master device adapted to guarantee the bidirectional transmission of data between the master device and each of the slave devices present, in a coherent manner, comprising the steps of:

a. Emission by the master device (1) at a predetermined frequency of a heading (5) whose structure comprises at least two temporary address values, NEXT (N) and ACTU (A) of which the value is different;

b. Entry of a slave device (2) into the field of action of the master device (1) and actuation of this latter;

c. Reception by the slave device (2) of the heading emitted at step a., decoding and saving the value of NEXT in an internal register;

d. Emission of an acknowledgement of reception by the slave device to the master device;

e. Counting up the value of NEXT (N) by the master device (1) upon reception of the acknowledgement of inscription;

f. Emission by the master device (1) of a screen by utilizing the value of ACTU (A) at a corresponding value to an inscribed slave device and to which a command is directed;

g. Comparison by the slave device of the transmitted value ACTU (A) to that saved in its register and decoding and executing the command only in case of equality of these values; and h. Repetition of steps a. to f. until the emission of an end of dialogue command by the master device (1).

2. Process according to claim 1, wherein that the value of NEXT (N) and of ACTU (A) are coded in four bits permitting in this way the processing of 15 slave devices simultaneously.

3. Process according to claim 1, wherein coding of the binary information during transmission of data by the master device or the slave device takes place in at least eight subdivisions of the number of cycles of the carrier necessary for the representation of one bit and that the signal is modulated during seven subdivisions to represent a binary value equal to 1 and during six subdivisions to represent a binary value equal to 0.

4. The process of claim 1, utilizing a slave device comprising: a volatile memory (15) containing the temporary addresses for inscription and selection; a comparison device (17) permitting comparing data contained in the command received and data from the memory (15, 16) of the device; a zero reset (18) of the functions to cancel the data saved in the volatile memory (15); a modulator (12) designed and adapted for modifying the radiation field such that the coded disturbance will become detectable by the master device; a demodulator (11) designed and adapted for extracting from the modulated carrier the coded signal carrying the information emitted by the master device; an analogical interfacial circuit transforming the binary signals into electromagnetic signals at the antenna and conversely toward the demodulator, and an autonomous supply circuit (13).

5. Process for the management of concurrent access between a master emitter/reader device (1) and plural receiver/transmitter slave devices (2) entering successively into or remaining in the field of action of the master device adapted to guarantee the bidirectional transmission of data between the master device and each of the slave devices present, in a coherent manner, comprising the steps of:

a. Emission by the master device (1) at a predetermined frequency of a heading (5) whose structure comprises at least two temporary address values, NEXT (N) and ACTU (A) of which the value is different;

b. Entry of a slave device (2) into the field of action of the master device (1) and actuation of this latter;

c. Reception by the slave device (2) of the heading emitted at step a., decoding and saving the value of NEXT in an internal register;

d. Emission of an acknowledgement of reception by the slave device to the master device;

e. Counting up the value of NEXT (N) by the master device (1) upon reception of the acknowledgement of inscription;

f. Emission by the master device (1) of a screen by utilizing the value of ACTU (A) at a corresponding value to an inscribed slave device and to which a command is directed;

g. Comparison by the slave device of the transmitted value ACTU (A) to that saved in its register and decoding and executing the command only in case of equality of these values; and h. Repetition of steps a. to f. until the emission of an end of dialogue command by the master device (1), wherein the structure of the heading emitted by the master device comprises a third temporary address value (R) permitting fixing the number of times the slave device must receive the same command before executing it, thus it comprises the following supplemental steps if R is greater than 1:

i. Saving by the slave device of a value of R in an internal register and saving the code of the command in a comparison circuit;

j. Decrease of R by one unit upon reception of an identical command;

k. Execution of the command when R is equal to 0.

6. The process of claim 5, utilizing a slave device comprising: a volatile memory (15) containing the temporary addresses for inscription and selection; a comparison device (17) permitting comparing data contained in the command received and data from the memory (15, 16) of the device; a zero reset (18) of the functions to cancel the data saved in the volatile memory (15); a modulator (12) designed and adapted for modifying the radiation field such that the coded disturbance will become detectable by the master device; a demodulator (11) designed and adapted for extracting from the modulated carrier the coded signal carrying the information emitted by the master device; an analogical interfacial circuit transforming the binary signals into electromagnetic signals at the antenna and conversely toward the demodulator, and an autonomous supply circuit (13).

7. The process of claim 6, wherein all the slave device components (11, 12, 13, 14, 15, 16, 17, 18) are disposed in a monolithic integrated circuit.

8. The process of claim 7, wherein the slave device further comprises an antenna (3) to receive signals and to extract the induced energy of the alternating field emitted by the master device, the monolithic integrated circuit (4) and the antenna (3) being encapsulated in a thin support of synthetic resin, of the credit card type.

9. The process of claim 7, wherein the monolithic integrated circuit is made in a modulable fashion with functional blocks from which can be configured the supply both for signals and for energy.

* * * * *